US008500539B2

(12) United States Patent
Schulze Huynh et al.

(10) Patent No.: US 8,500,539 B2
(45) Date of Patent: Aug. 6, 2013

(54) GAMING MACHINE, NETWORKED GAMING SYSTEM AND METHOD WITH A DYNAMIC BINGO CARD

(75) Inventors: Jennifer Schulze Huynh, Austin, TX (US); Clint Owen, Austin, TX (US); JP Cody, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 0 days.

(21) Appl. No.: 13/225,276

(22) Filed: Sep. 2, 2011

(65) Prior Publication Data

US 2012/0172105 A1 Jul. 5, 2012

Related U.S. Application Data

(60) Provisional application No. 61/429,850, filed on Jan. 5, 2011.

(51) Int. Cl.
*A63F 9/24* (2006.01)
*A63F 13/00* (2006.01)

(52) U.S. Cl.
USPC .................. 463/19; 463/16; 463/17; 463/18; 463/20; 463/21

(58) Field of Classification Search
USPC .................................................. 463/16–201
See application file for complete search history.

(56) References Cited

U.S. PATENT DOCUMENTS

| | | | | |
|---|---|---|---|---|
| 4,611,811 | A * | 9/1986 | Haase | 463/19 |
| 5,755,619 | A | 5/1998 | Matsumoto et al. | |
| 6,565,091 | B2 * | 5/2003 | Weingardt | 273/269 |
| 7,144,322 | B2 | 12/2006 | Gomez et al. | |
| 7,666,085 | B2 * | 2/2010 | Vorias et al. | 463/20 |
| 2003/0017868 | A1 * | 1/2003 | Crawford | 463/20 |
| 2004/0009806 | A1 * | 1/2004 | Odom | 463/19 |
| 2006/0025196 | A1 * | 2/2006 | Webb et al. | 463/16 |
| 2006/0025199 | A1 * | 2/2006 | Harkins et al. | 463/19 |
| 2008/0045325 | A1 | 2/2008 | Kato | |

* cited by examiner

*Primary Examiner* — Arthur O. Hall
*Assistant Examiner* — Jasson Yoo
(74) *Attorney, Agent, or Firm* — Russell D. Culbertson, Esq.; JP Cody, Esq.

(57) ABSTRACT

A system, apparatus, and method are disclosed with one or more dynamic bingo cards or artifices wherein each daubed number on a bingo card is removed from its initial location and re-located to the last position of the payline on which the daubed number is positioned and at least one other number on the associated payline is moved to replace the position vacated by the daubed number. Once the final number is drawn, paylines with all daubed numbers are paid according to the paytable. If all positions on a bingo card are daubed, then a progressive or other jackpot award may be paid.

20 Claims, 10 Drawing Sheets

*Fig. 1A*

103

| | | | | | |
|---|---|---|---|---|---|
| 2 | 61 | 5 | .. | .. | .. |
| 35 | 48 | 71 | .. | .. | .. |
| 15 | 32 | 12 | .. | .. | .. |
| 46 | 60 | 67 | .. | .. | .. |
| 72 | 28 | 22 | .. | .. | .. |
| 12 | 74 | 58 | .. | .. | .. |
| 37 | 11 | 31 | .. | .. | .. |
| 21 | 63 | 44 | .. | .. | .. |

GAMING MACHINE, NETWORKED GAMING SYSTEM AND METHOD WITH A DYNAMIC BINGO CARD

CROSS-REFERENCE TO RELATED APPLICATION

The Applicants claim the benefit, under 35 U.S.C. §119(e), of U.S. Provisional Patent Application No. 61/429,850 filed Jan. 5, 2011, and entitled "Gaming Machine, Networked Gaming System, And Method With A Dynamic Bingo Card." The entire content of this provisional application is incorporated herein by this reference.

COPYRIGHT NOTICE

A portion of the disclosure of this patent document contains material which is subject to copyright protection. The copyright owner has no objection to the facsimile reproduction of the patent document or the patent disclosure as it appears in the Patent and Trademark Office patent files or records, but otherwise reserves all rights of copyright whatsoever.

BACKGROUND OF THE INVENTION

1. Field of the Invention

This invention relates to gaming systems and to gaming machines used to present gaming results. More particularly, the invention relates to gaming systems, gaming machines and methods including one or more bingo cards or artifices which dynamically change after numbers or symbols are drawn corresponding to matching numbers or symbols on the bingo cards or artifices.

2. Description of the Related Art

A large number of different gaming machines have been developed to provide various formats and graphic presentations for conducting games and presenting game results. For example, some gaming machines include one or more bingo games wherein a bingo card may be virtually represented on a video display and balls may be drawn with numbers. Matching numbers are daubed on the bingo card, either manually or automatically, and awards are paid based on winning patterns corresponding to a paytable.

There continues to be a need to generate more player excitement by providing new aspects to games including bingo games.

SUMMARY OF THE INVENTION

The present invention includes gaming systems, gaming machines and gaming methods with one or more dynamic bingo cards or artifices wherein each daubed number on a respective bingo card is removed from its initial location and re-located to the last position of the payline on which the daubed number is positioned. At least one other number on the associated payline is moved to replace the position vacated by the daubed number. Once the final number is drawn, paylines with all daubed numbers are paid according to the paytable. If all positions on a bingo card are daubed, then a progressive or other jackpot award may be paid.

These and other features of the invention will be apparent from the following description of the illustrative embodiments, considered along with the accompanying drawings.

BRIEF DESCRIPTION OF THE DRAWINGS

FIGS. 1A, 1B, and 1C are each representations of a dynamic bingo card in accordance with one or more embodiments.

DESCRIPTION OF ILLUSTRATIVE EMBODIMENTS

Figure 1:
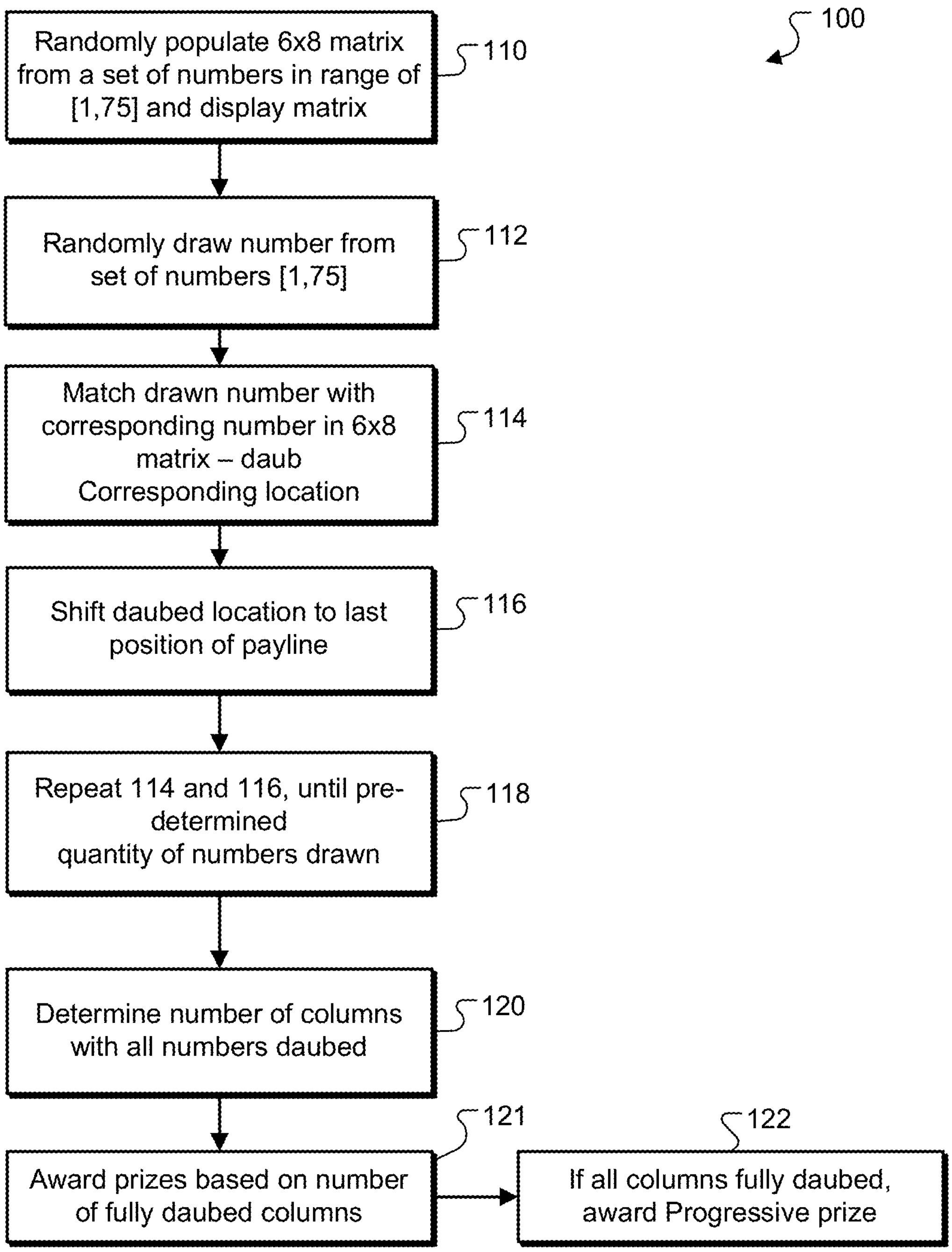
FIG. 1 is a flowchart of a bingo game using dynamic-numbered cards in accordance with one or more embodiments of the present invention.
Figure 1B:
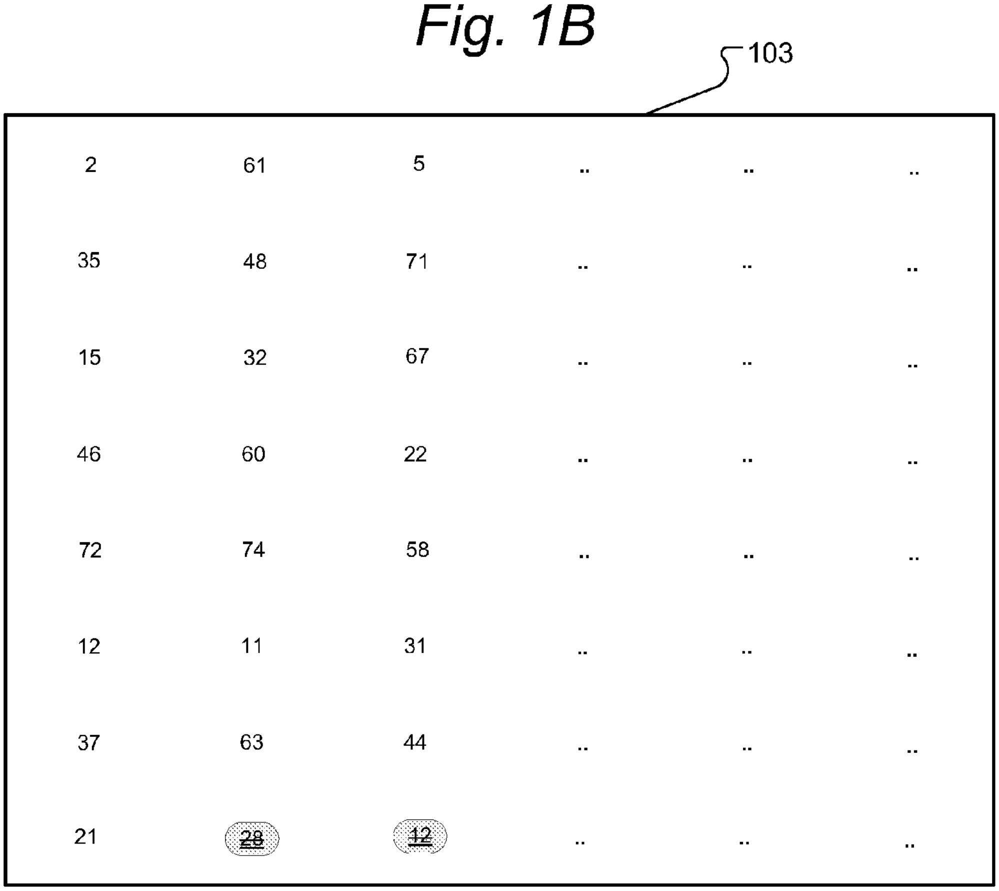
Figure 1C:
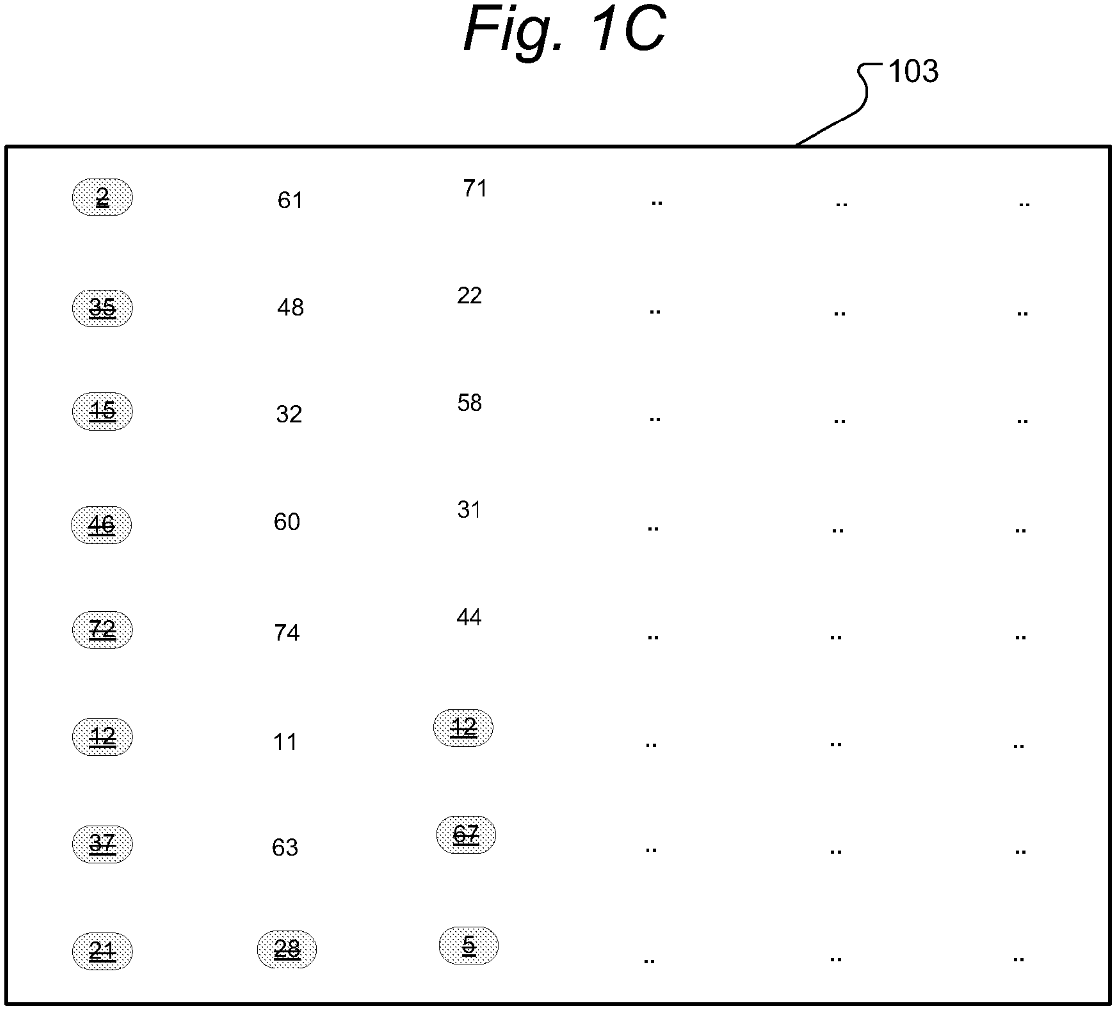

FIG. 1 shows an example method 100 for operating a bingo game with a dynamic bingo card in accordance with one or more embodiments of the present invention. FIGS. 1A, 1B, and 1C show a representation of a dynamic bingo card 103 and modifications to the card in accordance with the example method 100. It will be appreciated that the method 100 shown in FIG. 1 and described below may be implemented with a game processor and associated display device. An example gaming machine will be discussed in detail below in connection with FIGS. 2 and 3, while an example gaming network will be discussed below in connection with FIG. 4.

Referring to block 110 of FIG. 1, the example method 100 includes displaying a bingo card, such as example bingo card 103 shown in FIG. 1A, for viewing by a player at the gaming machine. In this particular example shown in FIG. 1A, bingo card 103 is generated as a 6×8 matrix of indicia locations. These indicia locations are randomly populated as shown at process block 110 from a pre-determined set of numbers, such as numbers 1 through 75 ([1,75]) for example. The step of generating the bingo card matrix and populating the indicia locations may be performed prior to initiating or as part of initiating a bingo game according to the present invention. For example, a player may make a wager and request a game to be initiated, which may cause a prior-generated randomly populated bingo card to be selected or cause a bingo card to be generated and randomly populated. In one or more embodiments, a player may be provided the option to request a differently populated bingo card than may be initially displayed. Additionally, a player may be provided the option to play more than one bingo card simultaneously to increase chances of winning. For example, a player may select four bingo cards to play simultaneously as shown in FIG. 1D, each bingo card being independently and randomly populated from the pre-determined set of numbers.

Figure 1D:
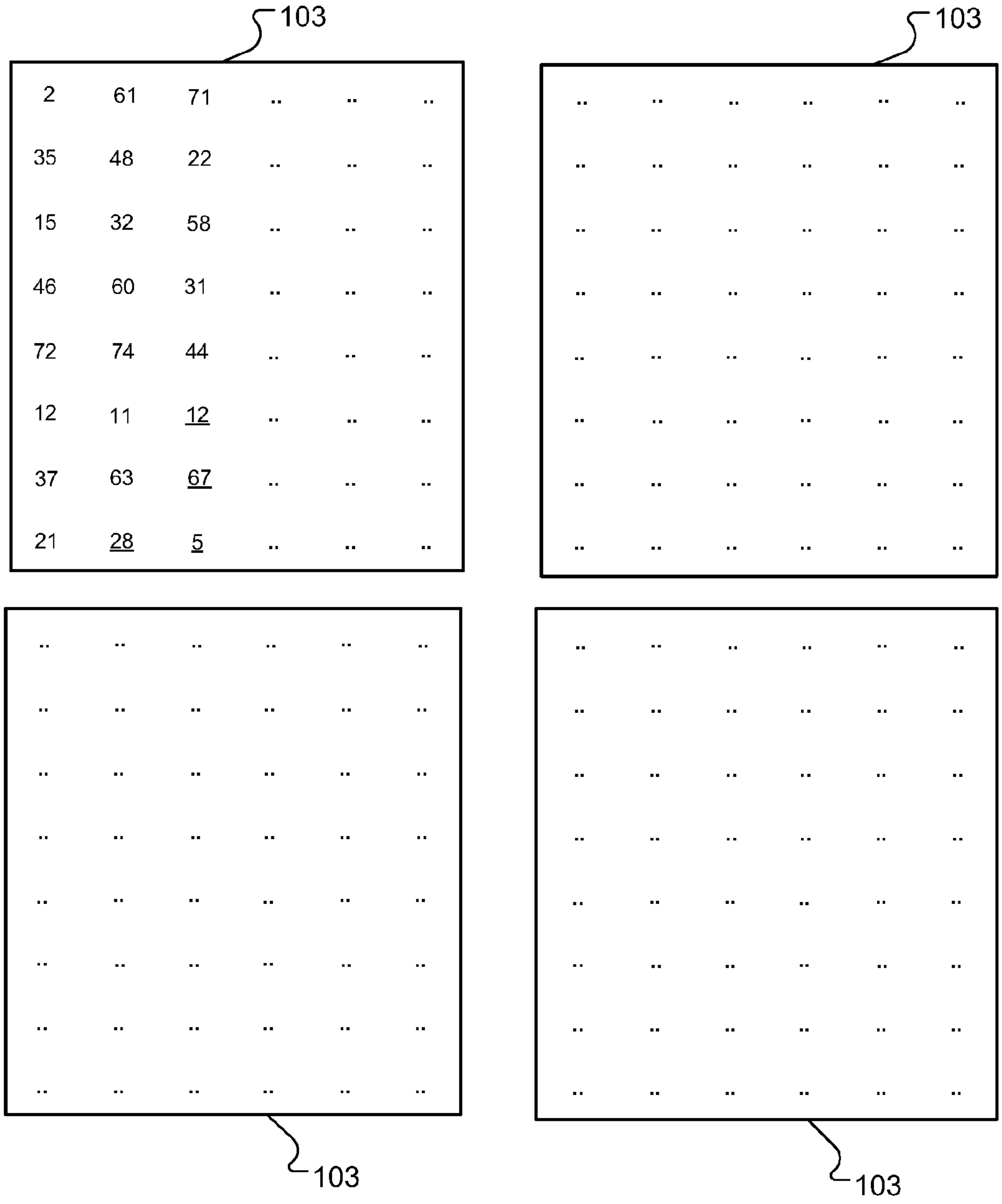
FIG. 1D is a representation of four different dynamic bingo cards which may be played simultaneously in embodiments of the present invention.

It should be appreciated that while a specific matrix size (namely, 6×8) has been shown in FIGS. 1-1D, and a predetermined number set has been presented for example purposes, various sizes of bingo card matrices and various predetermined sizes of number sets may be utilized. Number sets used to populate the bingo card indicia locations may be consecutive integer numbers as defined by the mathematical notation "[ ]" inclusive of the beginning and ending number.

Alternatively, any collection of numbers, indicia, and/or symbols which may be separately drawn for use in a game presentation, and matched during a game presentation with corresponding numbers, indicia, and/or symbols may be used to populate the bingo card indicia locations. In order to simplify the description of the present invention, the following discussion will follow the example method shown in FIG. 1 and the example bingo card representations shown in FIGS. 1A-1D, and refer to the predetermined set as comprising "numbers."

Once a bingo card such as example card 103 has been provided to or associated with the player, a number (or element such as a ball with a number) may be randomly drawn from the predetermined set of numbers as shown at process block 112 in FIG. 1. During a game presentation, once a number is drawn, the number may be compared with the numbers on the bingo card to identify a match as indicated at process block 114 in FIG. 1. If there is a match, the matched number on the bingo card may be daubed, such as by placing a strike-through across the number, circling the number, highlighting the number, or a combination thereof. Also, once a matching number is identified, the matching number may be rotated to the last position of a payline as indicated at process block 116. For example, if the column associated with the matched number is a payline, the matched number may be rotated to the bottom position of the column. If the row associated with the matched number is a payline, the matched number may be rotated to the right-most position of the row. For example, after the numbers "28" and "12" are drawn and matched in the example card shown in FIG. 1A, the respective numbers may be struck through, circled and/or highlighted and rotated to the bottom position of the column while moving one or more of the other respective column numbers upward. The resulting condition of the dynamic bingo card 103 is shown in FIG. 1B.

The process of drawing numbers and matching them with corresponding numbers on bingo card 103 may be repeated as shown at process block 118 until a predetermined subset size of numbers has been drawn from the predetermined set of numbers. With reference to the subset size of numbers to be drawn for each game, the size of the subset of numbers to be drawn may be determined based on such factors as: (i) the desired probability selected for winning outcomes (i.e. the element of chance that a game operator elects to provide within the parameters of legal regulations, such as no less than an 85% payout of winnings based on expected wagers and no more than 100%), (ii) the statistical amount to be paid out in winnings, and (iii) the matrix size of the bingo cards. However, additional factors or variables may be considered. For example, if a player is to be provided the opportunity to match all the numbers on bingo card 103 with the drawn numbers, then the size of the subset of numbers to be drawn needs to at least equal the number of positions on bingo card 103. For instance, if bingo card 103 comprises a 6×8 matrix of numbers and if the predetermined set of numbers equals seventy-five, then the size of the subset of numbers to be drawn may be equal to, less than, or more than forty-eight (the size of the bingo card matrix), but must be less than seventy-five in order to place an element of chance in determining whether the numbers of a given bingo card may match the drawn numbers.

Once the predetermined size of subset has been drawn from the predetermined set of numbers, each bingo card 103 may be evaluated as indicated at process block 120 in FIG. 1 to determine the number of winning paylines. For example, a winning payline may be defined as a column in which all of the numbers in the column have been matched/daubed. Applying this winning payline definition, the example bingo card 103 shown in FIG. 1C has one winning payline, namely, the first (left-most) column of the card.

Following the determination of the number of fully daubed columns, the game processor may provide an award to the player as shown at process block 121 in FIG. 1. Awards may be made in accordance with a paytable defined for the game. For example, a paytable may include various award levels based on the number of fully daubed columns. In the case where all columns are fully daubed, the player may be awarded the largest jackpot, such as a progressive prize which may be paid from a pool generated from a percentage of wagers of each of the players, from marketing money provided by the game operator, or from a combination thereof.

Figure 1E:
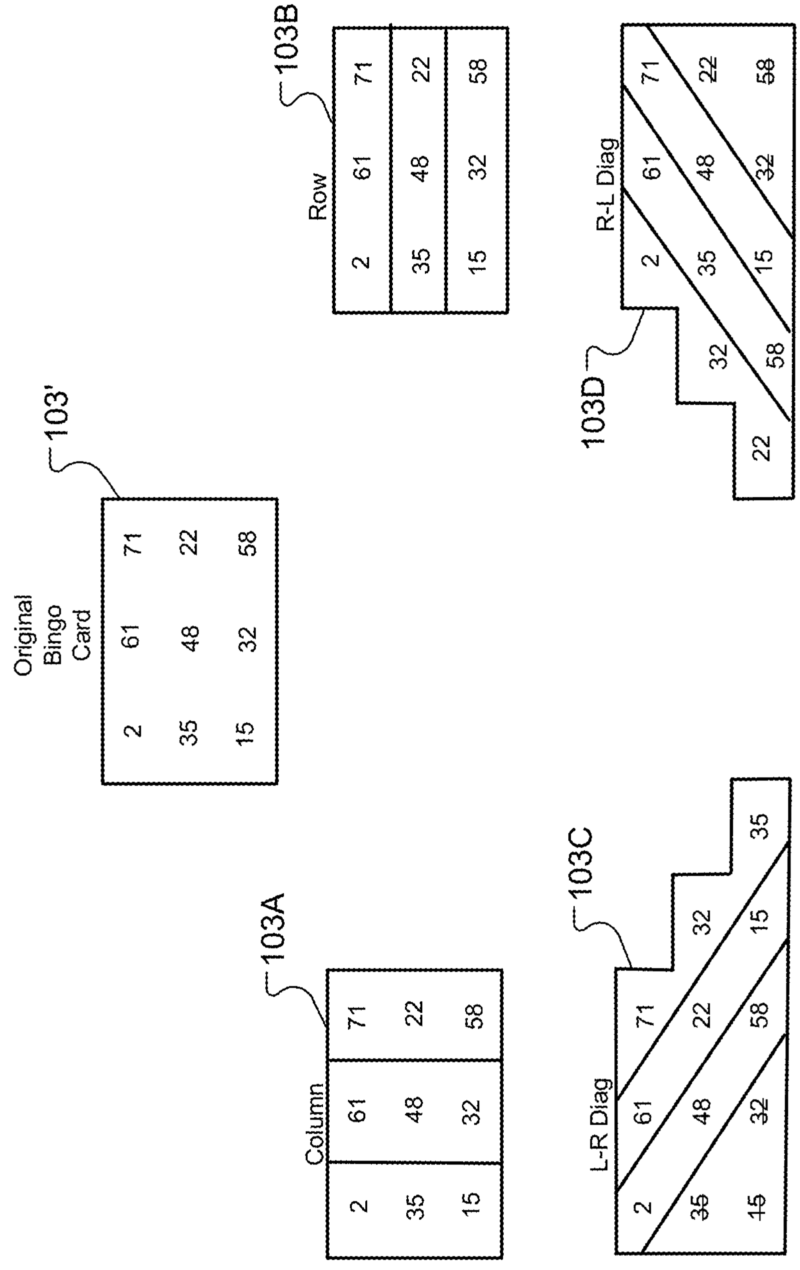
FIG. 1E is a representation of an alternate dynamic bingo card together with variations for defining paylines through the bingo card.
Figure 1F:
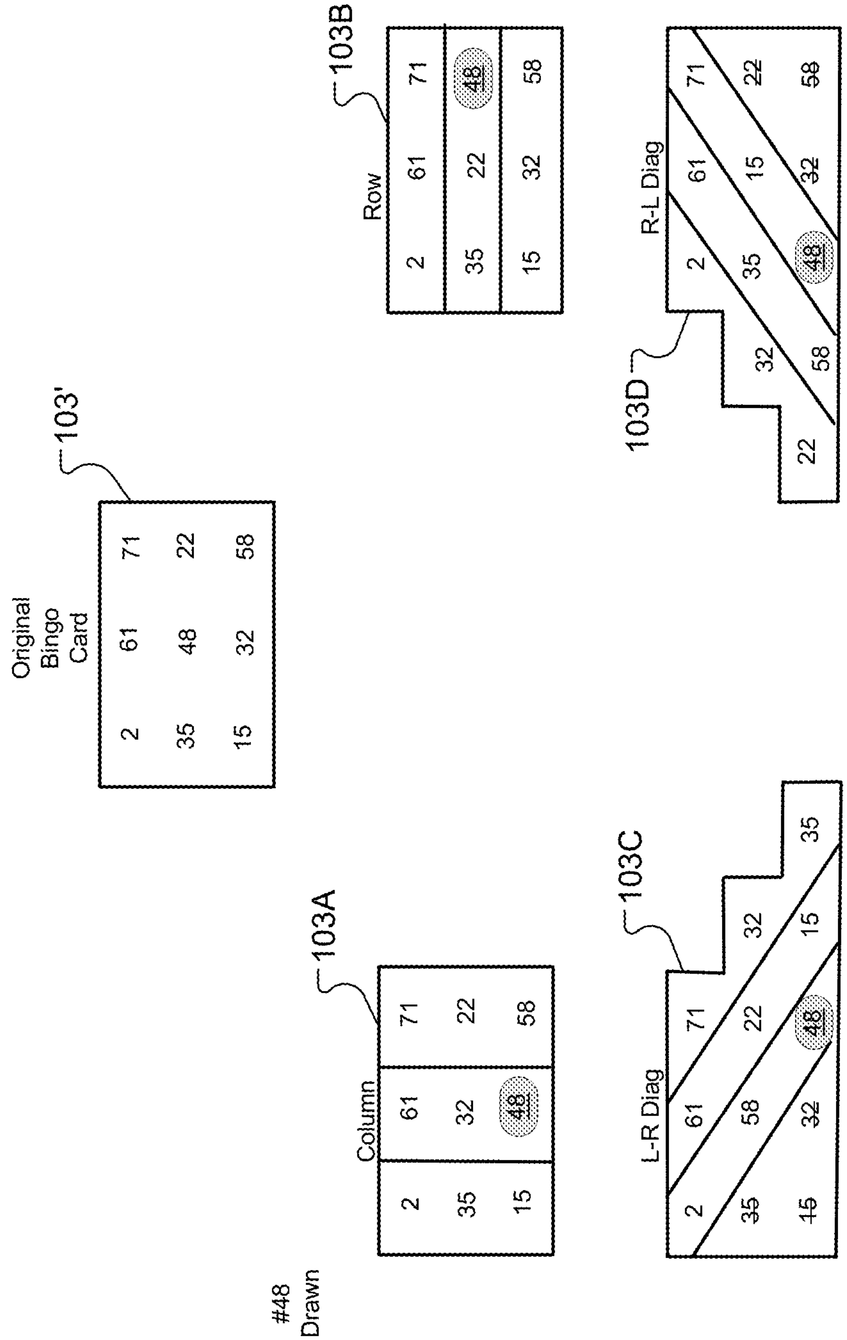
FIG. 1F is a representation of the alternate dynamic bingo card shown in FIG. 1E, as modified during the course of play in accordance with various embodiments of the present invention.

Referring to FIGS. 1E and 1F, in one or more embodiments, the active paylines for a bingo card may be defined columns as shown in bingo card 103A. In other embodiments the active paylines may be rows as shown in bingo card 103B. In yet other embodiments identically-numbered and positioned bingo cards may be used, one for column paylines and a second card for row paylines, so that when a matching number is drawn, the matched number in each card may be rotated to the last position of the respective payline, for example, the bottom of the associated column in bingo card 103A and the right-most position of the row in bingo card 103B. In one or more further embodiments, paylines may be associated with diagonals (upper left to lower right in bingo card 103C, and/or upper right to lower left in bingo card 103D. In such cases, two additional bingo cards may be generated for dynamic diagonal paylines by wrapping the indicia locations to extend each equal-length diagonal beginning with the first indicia of each column of original bingo card 103'. For example, original bingo card 103' may be extended from the upper left indicia to lower right to generate L-to-R diagonal bingo card 103C with three diagonals (2 48 58, 61 22 15, 71 32 35) and may be extended from upper right to left (R-to-L) to generate R-to-L diagonal bingo card 103D with three diagonals (2 32 22, 61 35 58, 71 48 15). In all, up to four bingo cards may be generated for paylines corresponding to columns, rows, L-to-R diagonals, and R-to-L diagonals. In the case of the diagonally generated bingo cards, the numbers that are wrapped around to complete the respective diagonals may be struck-through (as shown) in their original locations, faded out, or eliminated to avoid confusion. Also, the diagonals of the diagonal bingo cards may be straightened into columns or rows to display the example bingo cards as 3×3 matrices. In one or more embodiments, a player may have the option to elect to play all four different ways to win (columns, rows, L-R diagonals, R-L diagonals) which may require additional wagers for each. For example, a player may elect to wager one credit on columns, two credits on rows, and one credit on L-R diagonals, while not wagering on R-L diagonals. In other embodiments, the four ways to win may be provided to a player in exchange for a single wager.

As described above, when a number is drawn and matched, the number may be struck-through, underlined, circled, highlighted, and/or a combination thereof, and, rotated to the last position in the payline. For example, as shown in FIG. 1F, the number "48" has been drawn, matched with bingo cards 103A, 103B, 103C, and 103D, and rotated from its initial position on the respective bingo cards to the bottom position of the respective payline, that is, column, row, L-R diagonal, and R-L diagonal.

The game presentation and dynamic re-positioning of matching numbers may continue until the last number is drawn and payouts may be made in accordance with a paytable. In one or more embodiments, the paytable may identify awards based simply on the total number of fully daubed columns, rows, R-L diagonals, and/or L-R diagonals. In other embodiments, different awards may be associated with fully daubed columns, rows, R-L diagonals, and/or L-R diagonals. In one or more embodiments, players may be provided an option to wager one or more credits on the bingo game, and in instances where a player has wagered more than one credit, the game processor may multiply the number of credits wagered by the paytable award and pay the player accordingly. The player may also be provided an option to wager more credits on one type of payline win versus another. For example, a player may wager one credit on column-type and row-type wins and two credits on R-L and/or L-R diagonal wins which may be desirable if the paytable has a higher payout of one win versus another and/or a higher probability of winning versus another, or, if the paytable has a nonlinear increasing award associated with wins based on the number of credits wagered.

The random drawing indicated at process block 112 in FIG. 1 may be conducted through a game processor configured to execute a random number generator limited to a finite pool of the pre-determined set of numbers. In such an implementation a drawn number may be drawn only once and is thereafter eliminated from the pool during the balance of the drawing portion of the game. The game processor may be directly or remotely connected to a display device through which the bingo game matrix is displayed. For example, the game processor may be a remotely connected central determination server (as in Class II gaming) configured to randomly provide one or more bingo cards to each player and to draw the numbers associated with each game. Alternatively, the game processor may be a remotely connected game server or directly connected game processor, which may be configured to randomly generate or recall one or more bingo cards randomly populated with a first subset of a predetermined set of numbers for a player and randomly determine or draw a second subset of numbers from the predetermined set of numbers. The random drawing may be performed in real-time or may be performed at a different time and stored in memory for use at a later time. In cases when the drawing is not performed in real-time, the numbers may be drawn and stored as a set in the sequence drawn so that when a game is initiated, the set of drawn numbers may be used to provide a ball drawing presentation in the order of the original ball drawing. Multiple sets of drawn numbers may be stored, and when a game is requested by a player, one of the sets may be randomly selected by a game processor, and the numbers in the selected set may be drawn either in the sequence originally drawn or drawn randomly from the selected set to achieve the game outcome.

Figure 2:
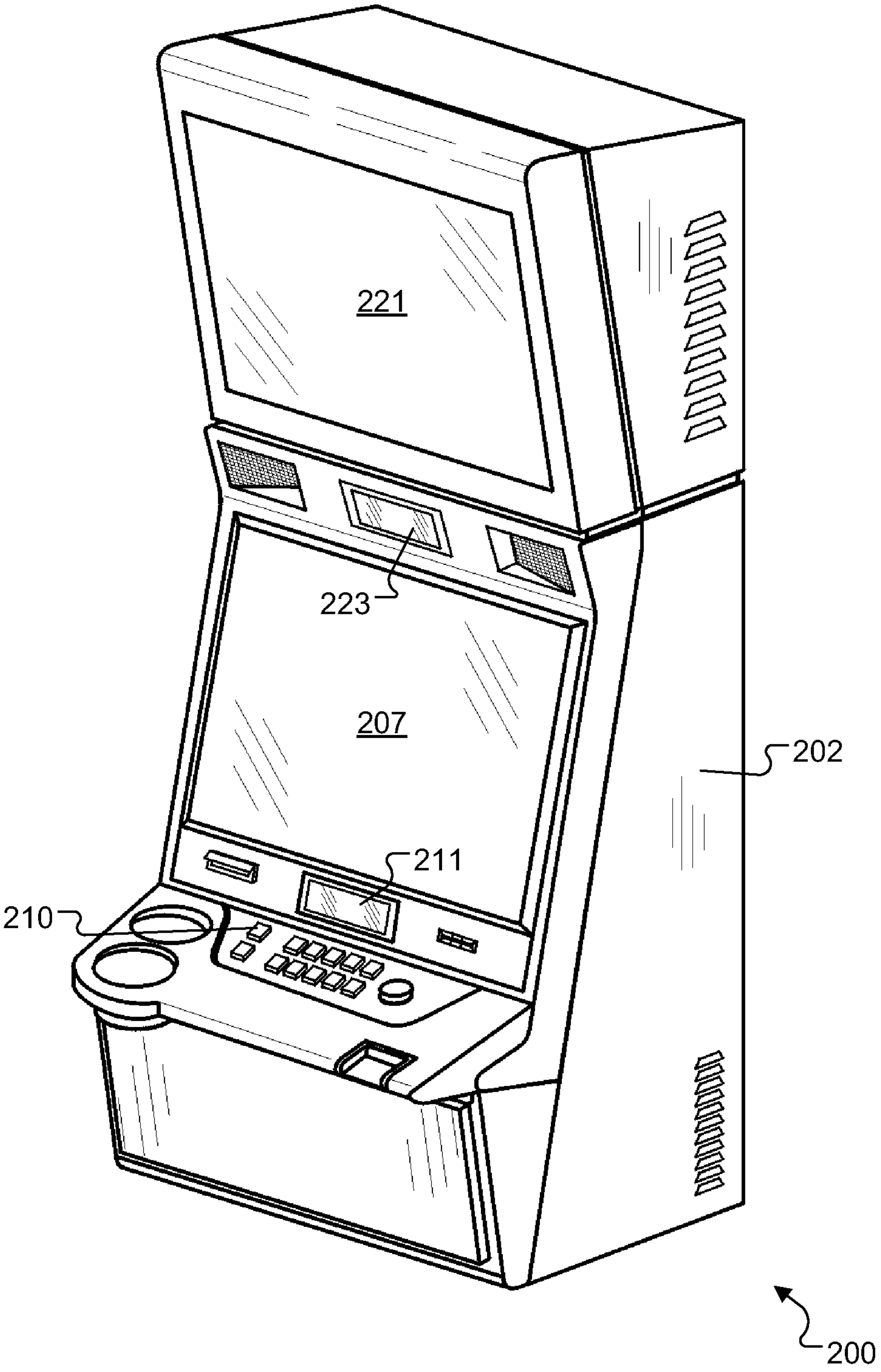
FIG. 2 is a front perspective view of an example gaming machine which may be used to implement embodiments of the present invention.

FIG. 2 shows an example gaming machine 200, such as a Multimedia Games® Fill'er Up™ or High Striker Bingo™ gaming machine, including primary display device 207 on which one or more dynamic bingo cards 103 shown in FIGS. 1A-1F may be shown or displayed in accordance with one or more embodiments of the present invention. Gaming machine 200 includes a top box display device 221 which may display a paytable with various winning outcomes associated with various awards. Middle display 223 may display a server-based game, advertising, or other content as may be provided over a network. User interface 210 with various mechanical buttons or other input devices enables a patron to place wagers and initiate play of one or more games at gaming machine 200. All of the display devices and user interface 210 are housed in or about gaming machine cabinet 202.

While gaming machine 200 is shown as an upright gaming machine cabinet style, various conventional cabinet styles may be utilized for providing bingo or other wagering games to players including a slant top cabinet style and a bar top cabinet style (where the cabinet may be part of a bar/table top and/or housed therein). Additionally, various less conventional cabinet or non-cabinet styles may be utilized for providing bingo or other wagering games to players including cellular phones (e.g. Blackberry® or Apple iPhone®), tablets (e.g. Apple iPad®), and personal computers, wherein various elements described above with respect to gaming machine 200 may be modified to provide substantially the same functionality. For example, the content otherwise shown on various displays of gaming machine 200 may be modified to be displayed as pages on a single display.

One or more paylines, combinations, or patterns of the symbols may be displayed on display device 207 and be correlated to a game result payable in accordance with a paytable such as may be displayed on display 221. A patron may initiate a game, such as a dynamic bingo game, by placing a wager and pressing a "PLAY" button included in user interface 210. In one or more embodiments, if a player is wagering on a bingo game with dynamic bingo cards, the player may place a single wager and be eligible to win on any and all paylines provided by the game. For example, if there is only a single dynamic bingo card with column-type paylines (for example, column-type bingo card 103A), then the possible winning paylines may be one, two, three, . . . 'n' fully daubed columns, where 'n' is the number of columns on the dynamic bingo card.

The paytable may have a corresponding award for each winning payline. The awards may be graduated linearly or nonlinearly as the number of daubed columns increase. Awards identified in the paytable may have fixed values, progressive values, or there may be a combination of fixed awards and progressive awards. For example, in the case of a column-wise dynamic bingo card, awards for 1 through (n−1) fully daubed columns may have fixed values, such as 10, 20, 30, . . . 10(n−1) credits in the case of a linearly increasing award schedule, and the award for 'n' fully daubed columns may be a progressive award. In one or more embodiments, a player may be able to wager one, two, . . . 'm' credits on each game, in which case the award identified in the paytable for the number of fully daubed columns may be multiplied by the number of credits wagered.

Display device 207 may thereby be used to display game results to a patron who may view gaming machine 200, and the game processor may make payment to the patron by incrementing a credit meter for winning outcomes of paylines in accordance with the paytable and upon which the patron has wagered.

While example gaming machine 200 may display a single dynamic bingo card, various numbers of dynamic bingo cards may be selected or utilized in an implementation of one or more embodiments, such as one, two, three, four, five, six, seven cards, and so forth, depending upon the number of simultaneous cards that the player may have wagered upon for the bingo game.

Display device 207 may comprise a touch-sensitive display panel, such as a flat panel LCD or LED display.

In one or more alternative embodiments, primary display device 207 may be programmed to display a bonus or feature game that may be triggered by the appearance of one or more special symbols or other random event in games employing the dynamic bingo cards. For example, when a bonus or feature game is triggered, the entire display area of primary display device 207 (or a portion thereof) may be transformed to display the bonus or feature game, and once the bonus or feature game is complete, primary display device 207 may revert to the primary game display state.

In one or more alternative embodiments, a touch sensitive portion of display device 207 may be programmed to display a player interactive element. For example, primary display device may display a selection of virtual (video-generated) buttons and display a message to the player to "choose a button." The requested action by the player, such as the selection of a displayed button or item, may cause the game to perform additional steps and/or provide one or more bonus or feature game outcomes and awards to the player.

In one or more alternative embodiments, gaming machine 200 may include mechanical reels with fixed or dynamic symbols. For example, display device 207 may include a flat panel screen overlaying a set of mechanical reels. The flat panel screen may display a dynamic bingo card game either as the primary game or as a feature game triggered by an event in a reel-based game. Conventionally, reels include reel strips with fixed symbols. However, reel strips may be, for example, implemented using FOLED (flexible organic LED) or comparable reel strips wherein one or more symbols may be programmed dynamically to vary the symbol and/or its appearance, either from one fixed image to another (such as changing a symbol to a wild symbol or changing a series of symbols to wild symbols), or, from a fixed image to a dynamic (e.g. animated or video) image or a set of miniature video reels. In various instances when a symbol changes to another symbol, a bonus or enhanced award may be paid in accordance with the paytable, or a multiple thereof, or may be an award (a fixed or progressive amount) paid separate from the paytable. In the event that the payment is a progressive, a progressive pool may be generated from an operator's marketing dollars or from play at one or more gaming machines which may be eligible for the progressive award.

Another conventional approach is to implement reels virtually (video reels) on a display, such as on primary display device 207. In the case of virtual displays of the reels, the symbols may be fixed or animated on each of the reels. In one or more alternative embodiments, overlapping display panels may be implemented to generate video or display effects over reels. For example, a bingo game using a dynamic bingo card such as card 103 described above may be a primary game or a feature game triggered by an event in the reel-based game, or vice versa. Display device 207 may be implemented as a transmissive (e.g. Aruze or WMS transmissive display panels) display or a transparent (e.g. Bally transparent display panels) display configured to display visual effects under the control of the game processor during the operation of a wagering game. In the case of virtual reels, the virtual reels may be recessed a distance from the overlapping display and segregated by dividers similar to dividers separating mechanical reels, which may provide a spatial characteristic (e.g. IGT PureDepth® display panels). In either case, the overlapping display may be touch sensitive and configured to interact with the player by transmitting and receiving signals in the cases when a game or other triggering event initiates execution of coding by the game processor to display a player-to-game interactive feature.

In one or more embodiments, the game processor operating the wagering game and interacting with various peripheral components in many instances is implemented as a microprocessor, such as an Intel Pentium® or Core® microprocessor, on a printed circuit board including one or more memory devices positioned within gaming machine 200. In alternative implementations, the game processor may be remote from gaming machine 200, such as on a server network connected to gaming machine 200, in which case the game operation as described herein may be accomplished through network communications to control the display of the game on gaming machine 200 including the lighting structure and effects as described herein.

Figure 3:
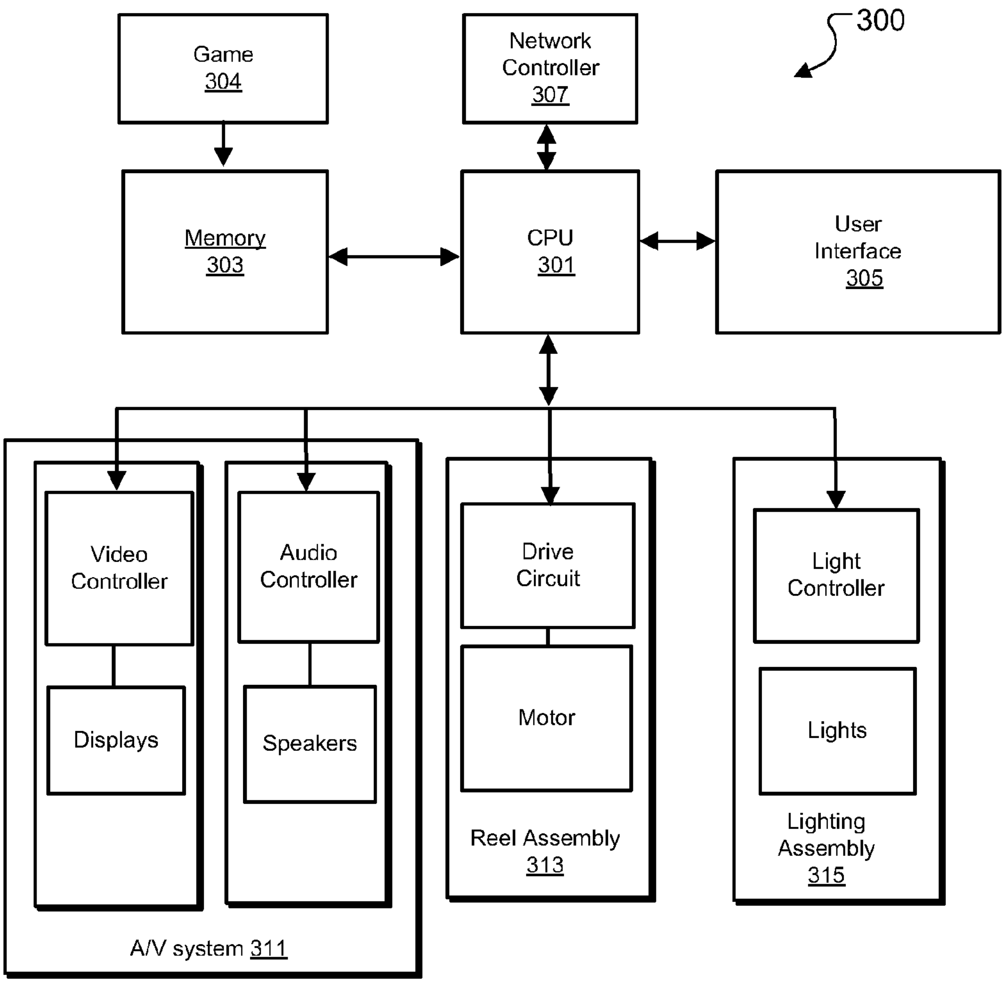
FIG. 3 is a logic diagram of an example of the gaming machine shown in FIG. 2.

As shown in the example logic diagram of gaming machine 200 shown in FIG. 3, implementations of the gaming machine may include a game processor or CPU 301, a memory device 303 storing a wagering game 304, a user interface 305, a network controller 307, an audio/visual system 311, a reel assembly 313 (if mechanical reels are included at the gaming machine), and a lighting assembly 315. Game processor 301 may comprise a conventional microprocessor, such as an Intel Pentium® or Core® microprocessor, mounted on a printed circuit board with supporting ports, drivers, memory, and coding to communicate with and control gaming machine operations, such as through the execution of program code stored in memory 303 including one or more wagering games 304. Game processor 301 connects to user interface 305 (which corresponds at least in part to the user interface arrangement shown generally at 210 in FIG. 2) such that a player may enter input information for conducting one or more games. Game processor 301 may respond to these inputs according to its programming, to, for example, apply a wager and initiate execution of a game.

Game processor 301 also may connect through network controller 307 to a gaming network, such as example casino server network 400 which will be described further below in connection with FIG. 4. Game processor 301 may also connect to various devices within and about the gaming machine including A/V system 311, reel assembly 313 (for implementations of gaming machine 200 including mechanical reel assemblies), and reel lighting assembly 315 through respective controllers.

Generally, activity at gaming machine 200 is initiated by a player inserting currency and/or a player card into a bill acceptor and card reader, respectively, included in user interface 305. Upon insertion of the currency (or currency equivalent, such as a printed voucher) or player card, a signal is sent to game processor 301. In the case of the insertion of a player card, the card reader transmits card information which is directed through network controller 307 to a player tracking server connected to the network. Player data is transmitted from the network to gaming machine 200, and, responsive to the data, game processor 301 may execute program code causing player data and a display command to be transmitted to one of the video controllers instructing the controllers to display player information on a respective display. An audio command may also be sent to the audio controller to cause an audio greeting to be generated through one or more speakers of gaming machine 200. Where currency or a currency equivalent is inserted into a bill acceptor, the bill acceptor sends a signal to game processor 301 which may include an identification of the currency that has been read. Game processor 301 in accordance with its programming may convert the currency amount to credits and transmit a store and display signal to a credit meter and its associated display at gaming machine 200. Once credits have been associated with the credit meter, the player may operate user interface 305 to select the number of paylines and credits per line that the player wishes to wager for a given instance of a game. Game processor 301, in accordance with its programming, receives the wager information from user interface 305, transmits accounting and display information to the payline ("Lines"), credits per payline ("Bet per Line"), and total bet ("Total Bet") meters and displays implemented at gaming machine 200, and transmits an update to the credit meter and display ("Credits") deducting the amount of the total bet. Generally, once a wager is selected the player is then required to actuate a "Play" button or other control of user interface 305 to send a signal to game processor 301 to prompt the game processor to initiate the wagering game in accordance with its programming.

In the case of Class III gaming devices, when a game is initiated, a random number generator (RNG) may be operated by game processor 301 to determine the game outcome. In one alternative of dynamic bingo, each number may be randomly determined (drawn as described above in connection with process block 112), either at or about the time that a game is initiated by the player, or, a set of numbers may be drawn and stored at an earlier time and selected by the game processor after a game is initiated (e.g. a randomly or sequentially selected set of numbers from multiple sets of numbers). Commonly, game processor 301 is positioned within gaming machine 200 and configured to manage the operation of the gaming machine components, such as shown in FIG. 3. However, the game processor may be either onboard or external to a gaming device played by a player, such as gaming machine 200 or an alternative device such as an electronic tablet (e.g. Apple iPad® or gaming specific tablet), personal data assistant (PDA), cellular telephone (e.g. Blackberry® or Apple iPhone®), surface table (e.g. Microsoft/IGT touch sensitive gaming surface table), etc. In the case of a remotely implemented game processor, an onboard microprocessor, controller, or digital signal processor may execute program code to transmit the wager and game request information through the network, and the remote game processor may operate an RNG to determine the game outcome.

In the case of Class II gaming devices, the overall structure of the various devices as discussed above is essentially the same, with the major difference being the method of determining the game outcome. Commonly, Class II gaming devices utilize the game of bingo as the basis for determining a winning outcome where the ball draw (number selection) is performed remotely by a network or central determination server (alternative games may be used for determining game outcomes, such as through a lottery drawing of a finite set of numbers, if permitted by the licensing jurisdiction). Class II gaming systems are commonly referred to as central determination systems wherein pools and sub-pools of game outcomes are determined by a central server (or gaming device) and distributed amongst a set of networked gaming devices. The distribution step may be on demand, such as when a gaming device receives a game request, or sets of game outcomes may be distributed to the various networked gaming devices in which case the game processor of the requesting gaming device may select a game outcome from the set of game outcomes, such as by using an RNG or other selection process.

Additionally, Class II gaming devices, such as a bingo-based gaming device, may have multiple displays, such as are shown in FIG. 2 wherein one of the display devices, such as display device 223, may be used to display one or more electronic bingo cards and one or more ball drawings after a game has been initiated in accordance with the game outcome (which may be provided to the gaming device by a central determination server). In one or more embodiments, primary display device 207 may comprise a set of reels, game processor 301 may display a dynamic bingo game in accordance with the centrally-determined game outcome (such as on display 223) and then convert the outcome to a second displayed game presentation (such as a reel-based game), then on completion of the game presentations, the player may be awarded credits for winning paylines.

In one or more embodiments, program code such as program code 304 may be implemented and stored in memory 303, executable by game processor 301 to control game operation, display content, lighting, and audio through video, audio, reel drive motor controllers (if mechanical reels are included in gaming machine 200), and lighting controllers.

A method of operating a bingo game with dynamic bingo cards such as card 103 described above may include generating a set of distinct bingo cards on a server, such as central determinant server 405, game server 403, or the server for gaming website 421 (all described further below in connection with FIG. 4). Each of the set of distinct bingo cards may be randomly populated by the server with a distinct set of indicia from a finite set of indicia in accordance with the step shown at process block 110 in FIG. 1. Additionally, one or more indicia subsets may be randomly generated by the server from the finite set of indicia. Each of the indicia subsets may comprise a predetermined number of indicia. Responsive to a first game request at a gaming device (such as gaming machine 200, or PC 423 or wireless device 425 described below in connection with FIG. 4) by a player, one or more randomly selected bingo cards from the set of distinct bingo cards and one of the indicia subsets may be transmitted by the server to the gaming device. The number of bingo cards transmitted may depend on the number requested and wagered upon by the player. Once received at the gaming device, the processor for the gaming device may initiate a presentation wherein indicia from the first indicia subset may be selected successively. As each indicia is selected, a determination may be made by the local processor at the gaming device as to whether the selected indicia matches an indicia associated with one of the selected bingo cards. If a match occurs, then the local processor may cause the bingo card to be automatically daubed or the player may interact with the display to manually daub the matched indicia. The local processor may then cause the display device to rotate or move the daubed indicia to a position lower than any undaubed indicia of an associated payline. The process may be repeated until each of the indicia of the first subset has been selected. Once complete, the processor may determine whether there are any winning paylines on each of the player's dynamic bingo cards by determining if any paylines are fully daubed. The processor may then increment the credit meter of the gaming device for any winning paylines in accordance with the paytable, thus ending the game.

Successive games may be operated by randomly generating successive indicia subsets from the finite set of indicia. Responsive to successive game requests at the gaming device, successive subsets of indicia may be transferred to one or more networked gaming devices. For each game, indicia may be successively selected from the indicia subsets in accordance with process block 112 shown in FIG. 1, followed by determinations of whether the selected indicia match indicia associated with one or more of the selected bingo cards in accordance with process block 114 in FIG. 1. For each match, the matched indicia may be daubed and, in accordance with process block 116 in FIG. 1, the daubed indicia may be rotated or moved to a position lower than any undaubed indicia of an associated payline. Once the process is completed, then the processor may determine winning paylines and provide awards according to the paytable.

In another alternative, responsive to successive game requests, the previously transmitted bingo cards may be replaced with one or more randomly selected bingo cards from the set of distinct bingo cards. The gaming device or server may provide an option to the player to replace the previously transmitted bingo cards with one or more randomly selected bingo cards from the set of distinct bingo cards.

In another alternative embodiment, once the indicia of a given subset have been selected in accordance with process block 112 in FIG. 1, an option may be provided for the player to purchase one or more additional randomly generated indicia from the finite set of indicia. If purchased, each of the additional indicia may be selected by the processor and compared to the card to determine a match. If there is a match, the matched indicia is daubed and rotated as described above. Once completed, the winning paylines may be determined and awards made by the processor.

In various embodiments, each of the bingo cards such as card 103 described above may include a set of columns of n indicia, each column of n indicia of each of the selected bingo cards may be associated with a payline, and any column with all daubed indicia may be identified as a winning payline.

In various embodiments, each of the bingo cards may include a set of rows of m indicia, each row of m indicia of each of the selected bingo cards may be associated with a payline, the right-most position on each row may be identified as the lowest position, and any row with all daubed indicia may be identified as a winning payline.

In various embodiments, each of the bingo cards may include a set of left-to-right (L-R) or right-to-left (R-L) diagonals of m indicia. Each diagonal of m indicia of each of the selected bingo cards may be identified with a payline, and any L-R or R-L diagonal with all daubed indicia may be identified as a winning payline.

In some embodiments, a player may be provided the option to wager one or more credits on each bingo card for each game. Another option may be provided to the player to request one or more bingo cards for each game. Yet another option may be provided for a player to select one or more types of paylines for each game. The different types of paylines may include one or more sets of columns, rows, L-R diagonals, and R-L diagonals.

The indicia subsets in some embodiments may include one or more special or wild symbols. In the event a wild symbol is selected during a game, the wild symbol may be set aside until all other indicia have been drawn, then the wild symbol may be used to match any one of the remaining undaubed symbols. In the event a special symbol is selected, a feature game may be triggered. Upon completing the feature game and presenting an award, the primary game may continue from its original state, and, the special symbol may or may not transform to a wild symbol operable as described above.

Figure 4:
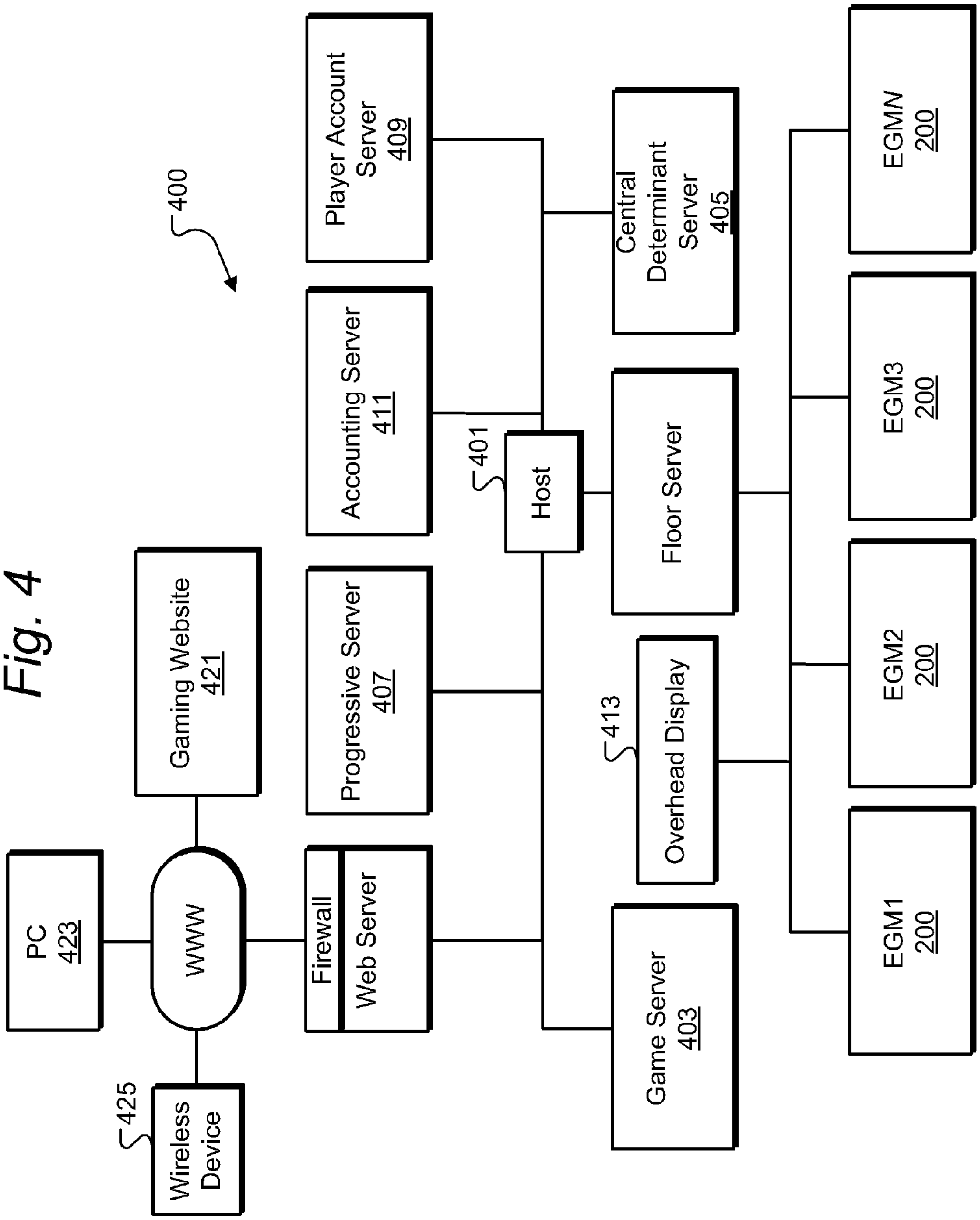
FIG. 4 is a block diagram of an example gaming network in accordance with one or more embodiments of the present invention.

Referring to FIG. 4, a block diagram of example networked gaming system 400 associated with one or more gaming facilities is shown including one or more networked gaming machines 200 employing dynamic game cards in accordance with embodiments of the present invention (such as the dynamic game cards shown in FIGS. 1A-1E for example). Networked gaming system 400 is illustrated as including host server 401, remote game play server 403, central determinant server 405, progressive server 407, player account server 409, and accounting server 411. Through its network connection, each gaming machine 200 may be monitored by an operator through one or more servers such as to assure proper operation, and, data and information may be shared between the respective gaming machine on one or more of the servers in the network such as to accumulate or provide player promotional value, to provide server-based games, or to pay server-based awards. It will be appreciated that while a few servers have been shown separately in FIG. 4, they may be combined or split into additional servers having additional capabilities.

Networked gaming machines 200 (EGM1-EGMN) and one or more overhead displays 413 may be network connected as indicated in FIG. 4 to enable the content of one or more displays of dynamic bingo cards to be mirrored or replayed on the overhead display or displays. For example, the primary display content may be stored by the display controller or game processor 301 of a respective gaming machine and transmitted through network controller 307 (shown in FIG. 3) to a controller of the overhead display either substantially simultaneously or at a subsequent time according to either periodic programming executed by game processor 301 or to a triggering event, such as a jackpot or large win, at the respective gaming machine 200. In the event that gaming machines 200 have cameras installed, the respective player's video images may be displayed on overhead display 413 along with the content of the player's display and any associated audio feed may be output at speakers associated with overhead display 413.

In one or more embodiments, game server 403 may provide server-based games and/or game services to network connected gaming devices, such as gaming machines 200 (which may be connected by network cable or wirelessly). That is, game server 403 may be configured to provide game processor functionality including determining game outcomes and providing audio/visual instructions to a remote gaming device such as a gaming machine 200. Central determinant server 405 may be configured to determine lottery, bingo, or other centrally determined game outcomes and provide the information to networked gaming machines 200 providing lottery and bingo-based wagering games to patrons. Progressive server 407 may accumulate progressive awards by receiving defined amounts (such as a percentage of the wagers from eligible gaming devices or by receiving funding from marketing or casino funds) and pay out progressive awards to winning gaming devices upon a progressive event. A progressive event may comprise a progressive jackpot game outcome or other triggering event such as a random or pseudo-random win determination at a networked gaming device or server, and may provide a large potential award to players playing the given game). Accounting server 411 may receive gaming data from each of the networked gaming devices, perform audit functions, and provide data for analysis programs, such as the IGT Mariposa™ program bundle.

Player account server 409 may maintain player account records, and store persistent player data such as accumulated player points and/or player preferences. For example, player interface display device 211 shown in FIG. 2 may be controlled to display a player menu that may include a choice of icons or elements that may be selected to personalize the effects generated on the display.

In one or more embodiments, the player menu may be displayed after a player inserts a player card into the card reader. When the card reader is inserted, an identifier may be read from the card and transmitted to player account server 409. Player account server 409 transmits player information through network controller 307 (shown in FIG. 3) to player interface 210 for display on player interface display device 211. Player interface display device 211 may provide a personalized welcome to the player, the player's current player points, and any additional personalized data. If the player has not previously made a selection, then this information may or may not be displayed. An icon may be provided on the display to open a selectable menu. Once the player makes a selection, the information may be transmitted to game processor 301 for storing and use during a player's gaming session. Also, the player's selection may be transmitted to player account server 409 where it may be stored in association with the player's account for transmission to the player in future gaming sessions. The player may change preferences at any time using player interface display device 211 (which may be touch sensitive or have player-selectable buttons associated with the various display selections).

The networked gaming system 400 shown in FIG. 4 includes a gaming website 421. In some network implementations this website 421 may include a selectable menu for player preferences. In this case, the player may use personal computer 423 or handheld wireless device 425 (e.g. Blackberry® cell phone, Apple® (phone, personal data assistant (PDA), iPad®, etc.) to log in to the website 421 with a user name (that may be associated with the player's account information stored on player account server 409). The player may then make a selection from the menu and save it, so that on the next gaming session at the gaming facility, the player's personalized selections may be transmitted to the player's selected gaming machine 200.

Website 421 may also be implemented to facilitate the play of wagering games through PCs 423 and/or wireless devices 425. Alternatively to website access, gaming network 400 may also be implemented to allow PCs 423 and/or devices 425 to connect to game server 403 through a casino firewall (e.g. server-based gaming). In either case, PCs 423 and/or wireless devices 425 may include touchscreen displays and be operable substantially in the same manner as gaming machine 200 described above. In variations of these embodiments, one or more networked PCs 423 and/or wireless devices 425 may not have a touchscreen display and may have alternative player interfaces, such as a mouse or joystick, which may be operable to be used by a player in place of touching the display to initiate a wager or play a game. For example, a mouse may be configured to enable a player to select a wager through a suitable graphic user interface (GUI) at the PC or wireless device and then select a "Play" icon of the GUI to initiate the game. In some embodiments, the wagering game may be a simulated wagering game playable with "play" money or casino-issued points rather than currency or currency equivalent credits, wherein the accumulated points may be used to rank a player on a leaderboard and/or be used to exchange for promotional credits or value useable at a sponsor's facility (e.g. casino facility).

Referring generally to the forgoing description and the following claims, as used herein the terms "comprising," "including," "carrying," "having," "containing," "involving," and the like are to be understood to be open-ended, that is, to mean including but not limited to. Also, any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described example embodiments are intended to illustrate the principles of the invention, but not to limit the scope of the invention. Various other embodiments and modifications to these preferred embodiments may be made by those skilled in the art without departing from the scope of the present invention. For example, in one or more embodiments, a player may be provided an opportunity to purchase additional numbers to be randomly drawn for an additional wager. For example, a player may have a card that is one ball short of completing a column, row, L-R diagonal, or R-L diagonal and may wish to wager an additional credit in exchange for one or more additional balls to be drawn.

The invention claimed is:

1. A method of operating a gaming machine, the method including:

(a) displaying an image of a card at an electronic display device of the gaming machine, the image of the card including an n row by m column matrix of locations with one or more paylines defined across the matrix of locations, and wherein a paytable for the gaming machine defines one or more winning paylines, each winning payline being correlated in the paytable with one or more awards;

(b) with a system of one or more processors associated with the gaming machine, causing the electronic display device to randomly populate each of the locations with indicia from a finite set of indicia, the number of locations being less than the size of the finite set;

(c) with the system of one or more processors associated with the gaming machine, randomly selecting an indicia from the finite set and determining whether a match occurs on the card between the randomly selected indicia and an indicia populating a location of the matrix;

(d) if a match occurs in step (c), then:

(i) daubing the location of the matching indicia in the matrix of locations, and (ii) rotating the matching indicia to an end position of an associated payline in the displayed card image by moving the matching indicia from its original position in the associated payline to the end position and shifting the indicia between the original position of the matching indicia and the end position one position toward the original position of the matching indicia;

(e) repeating steps (c) and (d) until a predetermined number of indicia have been selected and any match has been daubed and rotated according to step (d);

(f) with the system of one or more processors associated with the gaming machine, identifying any winning paylines produced in the displayed card image through steps (c), (d), and (e); and (g) for each winning payline identified at step (f), providing the one or more awards correlated to that respective winning payline in the paytable.

2. The method of claim 1 wherein the card includes a set of columns of n indicia, wherein each column of n indicia is defined as a payline, wherein any column with all daubed indicia is defined as one of the winning paylines, and wherein the lower-most position on each column is defined as the end position for that column.

3. The method of claim 1 wherein the card includes a set of rows of m indicia, wherein each row of m indicia is defined as a payline, wherein any row with all daubed indicia is defined as one of the winning paylines, and wherein the right-most position on each row is defined as the end position for that row.

4. The method of claim 1 wherein the card includes a set of left-to-right diagonals of x indicia, wherein each left-to-right diagonal of x indicia is defined as a payline, wherein a left-to-right diagonal with all daubed indicia is defined as one of the winning paylines, and wherein the right-most position on each left-to-right diagonal is defined as the end position for that diagonal.

5. The method of claim 1 wherein the card includes a set of right-to-left diagonals of y indicia, wherein each right-to-left diagonal of y indicia is defined as a payline, wherein right-to-left diagonal with all daubed indicia is defined as one of the winning paylines, wherein the left-most position on each right-to-left diagonal is defined as the end position for that diagonal.

6. The method of claim 1 including the step of providing an option at the gaming machine for a player to select one or more types of paylines for each game, wherein the types of paylines include one or more of columns, rows, left-to-right diagonals, and right-to-left diagonals.

7. A method of operating a bingo gaming system, the method including:

(a) displaying a dynamic bingo card at a display device of a gaming machine, the dynamic bingo card being displayed with randomly populated indicia from a finite set of indicia to form one or more paylines through the dynamic bingo card;

(b) with a game processor, randomly selecting an indicia from the finite set and determining whether a match occurs with one of the populated indicia;

(c) if a match occurs, then:

daubing the matching indicia in the displayed dynamic bingo card, and rotating the daubed indicia to a position lower than any undaubed indicia of the payline in which the daubed indicia is located by moving the daubed indicia to a new position lower than any undaubed indicia and shifting the indicia between the original position of the daubed indicia and the new position one position toward the original position of the daubed indicia;

(d) repeating steps (b) and (c) until a predetermined number of indicia have been selected according to step (b) and each match has been daubed and rotated according to step (c); and (e) providing one or more awards for any winning paylines defined according to a paytable which correlates each of a number of winning payline definitions to a respective award.

8. A method of operating a bingo gaming system, the method including:

(a) generating a set of distinct bingo cards on a server, each of the set of distinct bingo cards randomly populated with a distinct set of indicia from a finite set of indicia;

(b) randomly generating a first indicia subset from the finite set of indicia, the first subset comprising a predetermined number of indicia;

(c) responsive to a first game request at a gaming device, transmitting one or more randomly selected bingo cards from the set of distinct bingo cards from the server to the gaming device;

(d) selecting an indicia from the first indicia subset and determining whether the selected indicia matches an indicia associated with one of the selected bingo cards;

(e) if a match occurs, then:

daubing the matched indicia in a displayed image of the respective bingo card in which the match occurred, the image of the respective bingo card being displayed on a display apparatus of the gaming device, and in the displayed image of the respective bingo card in which the match occurred, rotating the daubed indicia to a position lower than any undaubed indicia of a payline of the respective bingo card in which the daubed indicia is located by moving the daubed indicia to a new position lower than any undaubed indicia and shifting the indicia between the original position of the daubed indicia and the new position one position toward the original position of the daubed indicia;

(f) repeating steps (d) and (e) until each indicia of the first subset has been selected and any match daubed and rotated according to step (e); and (g) providing one or more awards for any winning paylines defined by daubed card locations in a respective one of the selected bingo cards.

9. The method of claim 8 further including also transmitting the first indicia subset from the server to the gaming device responsive to the first game request.

10. The method of claim 9 further including:

(a) randomly generating a second indicia subset from the finite set of indicia, the second subset being the same size as the first indicia subset;

(b) responsive to a second game request at the gaming device, transmitting the second indicia subset to the gaming device;

(c) selecting an indicia from the second indicia subset and determining whether the selected indicia matches an indicia associated with one of the selected bingo cards;

(d) if a match occurs, then:

daubing the matched indicia on the display apparatus, and rotating the daubed indicia to a position lower than any undaubed indicia of a payline of the respective bingo card in which the daubed indicia is located, disregarding any daubed indicia from matches with the first indicia subset;

(e) repeating steps (c) and (d) of this claim until each of the indicia of the second subset have been selected; and (f) providing one or more awards for any winning paylines defined by card locations daubed by matches with the second indicia subset.

11. The method of claim 9 including the steps of:

(a) responsive to the second game request, transmitting one or more randomly selected additional bingo cards from the set of distinct bingo cards from the server to the gaming device along with the second indicia subset to the gaming device;

(b) selecting an indicia from the second indicia subset and determining whether the selected indicia matches an indicia associated with one of the selected additional bingo cards;

(c) if a match occurs, then:

daubing the matched indicia on the display apparatus, and rotating the daubed indicia to a position lower than any undaubed indicia of a payline of the respective bingo card in which the daubed indicia is located;

(d) repeating steps (b) and (c) of this claim until each of the indicia of the second subset have been selected; and (e) providing one or more awards for any winning paylines defined by card locations daubed by matches with the second indicia subset.

12. The method of claim 9 including responsive to a second game request, providing at the gaming device the option to replace the previously transmitted bingo cards with one or more randomly selected additional bingo cards from the set of distinct bingo cards.

13. The method of claim 8 including:

(a) after each of the indicia of the first subset have been selected, providing an option at the gaming device to purchase one or more additional randomly generated indicia from the finite set of indicia; and (b) if purchased, repeating step (e) of claim 8 for each additional indicia until each of the additional indicia have been selected.

14. The method of claim 8 wherein each of the bingo cards includes a set of columns of n indicia, wherein each column of n indicia of each of the selected bingo cards is defined as a payline, and wherein any column with all daubed indicia is defined as one of the winning paylines.

15. The method of claim 8 wherein each of the bingo cards includes a set of rows of m indicia, wherein each row of m indicia of each of the selected bingo cards is defined as a payline, wherein any row with all daubed indicia is defined as one of the winning paylines, and wherein the right-most position on each row is defined as the lowest position for that row.

16. The method of claim 8 wherein each of the bingo cards includes a set of left-to-right diagonals of x indicia, wherein each left-to-right diagonal of x indicia of each of the selected bingo cards is defined as a payline, and wherein a respective left-to-right diagonal with all daubed indicia is defined as one of the winning paylines.

17. The method of claim 8 wherein each of the bingo cards includes a set of right-to-left diagonals of y indicia, wherein each right-to-left diagonal of y indicia of each of the selected bingo cards is defined as a payline, and wherein a respective right-to-left diagonal with all daubed indicia is defined as one of the winning paylines.

18. The method of claim 8 including the step of providing an option at the gaming device for a player to select one or more types of paylines for each game, wherein the types of paylines include one or more of columns, rows, left-to-right diagonals, and right-to-left diagonals.

19. The method of claim 8 including the step of triggering a feature game with the appearance of a special symbol comprising one of the indicia in the first indicia subset, and upon completing the feature game, continuing the bingo game from the state at which the feature game was triggered.

20. The method of claim 19 including following the feature game, transforming the special symbol to a wild symbol and applying the wild symbol to match any one of the remaining undaubed indicia.

* * * * *